(12) United States Patent
Lyons et al.

(10) Patent No.: US 7,976,932 B1
(45) Date of Patent: *Jul. 12, 2011

(54) BALLISTIC-RESISTANT PANEL INCLUDING HIGH MODULUS ULTRA HIGH MOLECULAR WEIGHT POLYETHYLENE TAPE

(75) Inventors: Fielder Stanton Lyons, Phoenix, AZ (US); Jeffrey A. Mears, Chandler, AZ (US); Gene C. Weedon, Richmond, VA (US); Kenneth C. Harding, Midlothian, VA (US); Lisa Owen, Charlotte, NC (US); Peter Anthony Russell, Liberty Township, OH (US); Joseph Mitchell, Charlotte, NC (US); Erik Johnson, Phoenix, AZ (US)

(73) Assignee: BAE Systems Tensylon H.P.M, Inc., Monroe, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/455,279

(22) Filed: May 29, 2009

Related U.S. Application Data

(63) Continuation-in-part of application No. 11/881,863, filed on Jul. 30, 2007, which is a continuation-in-part of application No. 11/821,659, filed on Jun. 25, 2007, and a continuation-in-part of application No. 11/787,094, filed on Apr. 13, 2007.

(51) Int. Cl.
*B29C 65/00* (2006.01)
*B32B 37/10* (2006.01)
*B32B 37/22* (2006.01)

(52) U.S. Cl. ............ 428/156; 139/383 R; 156/164; 156/194; 156/304.6; 428/107; 428/213; 428/364; 429/144; 442/135

(58) Field of Classification Search .......... 428/156, 428/107, 213, 364; 139/383; 156/194, 304.6, 156/164; 429/144; 442/135
See application file for complete search history.

(56) References Cited

U.S. PATENT DOCUMENTS

| 6,162,746 | A | 12/2000 | Chiou |
| 6,893,704 | B1 | 5/2005 | van der Loo |
| 6,945,155 | B2 | 9/2005 | Cordova et al. |
| 7,354,875 | B2 | 4/2008 | Hand et al. |
| 7,393,588 | B1 | 7/2008 | Howland |
| 2010/0003452 | A1* | 1/2010 | Jongedijk et al. ............ 428/107 |

* cited by examiner

*Primary Examiner* — Brent T O'Hern

(57) ABSTRACT

A ballistic resistant panel including a strike face portion and a backing portion. The strike face portion includes a plurality of interleaved layers of non-fibrous ultra high molecular weight polyethylene tape. The backing portion includes a plurality of interleaved layers of cross-plied fibers of ultra high molecular weight polyethylene. The entire stack of interleaved layers is compressed at high temperature and pressure to form a ballistic resistant panel having a strike face on one side. It has been found that ballistic resistance increases as the weight ratio of the strike face portion with respect to the backing portion decreases. A composite panel having a strike face Tensylon tape with at most 40% of the total weight of the panel exhibits improved ballistic resistance properties as compared to a monolithic structure of strictly interleaved layers of cross-plied high modulus fibers.

14 Claims, 9 Drawing Sheets

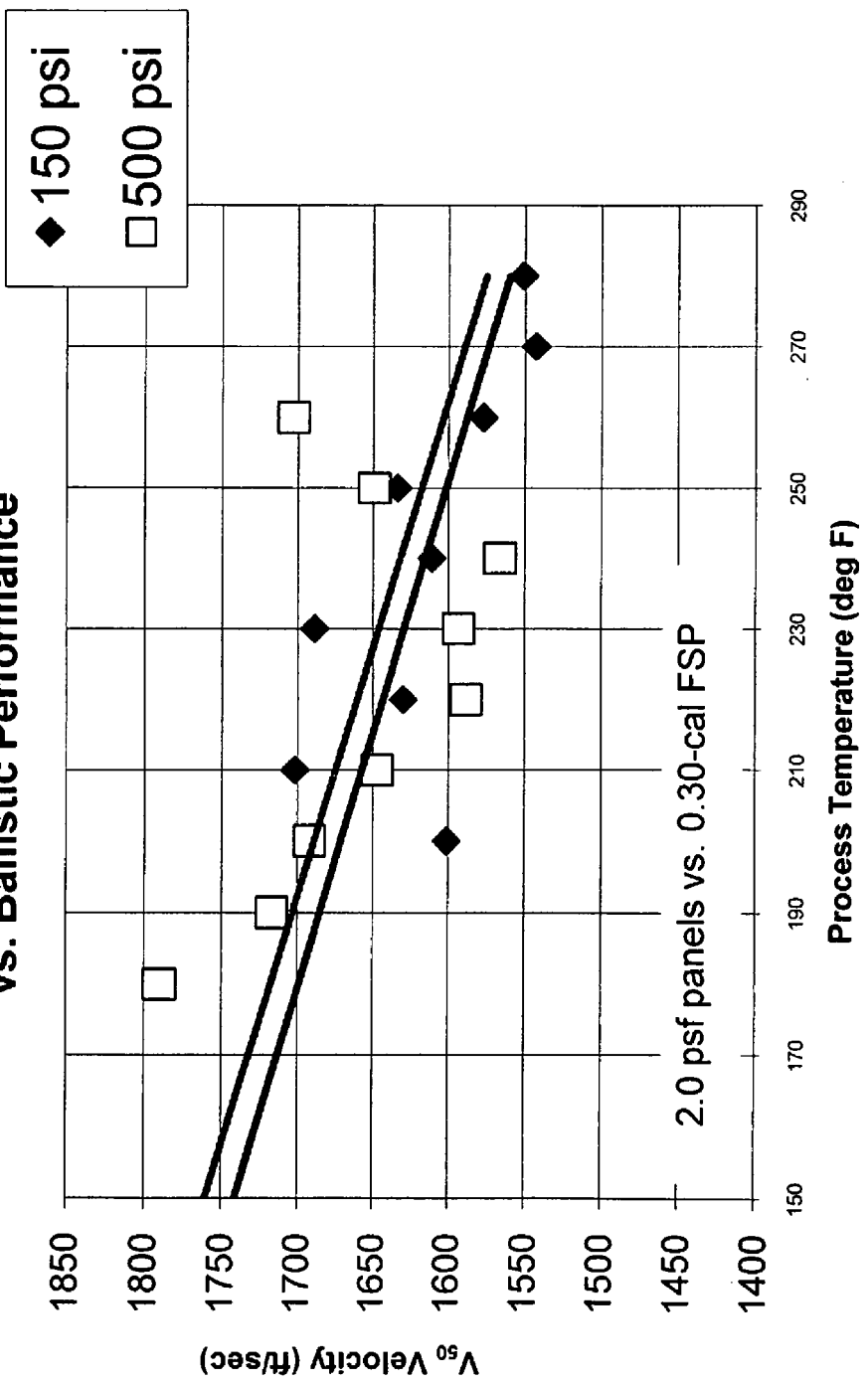

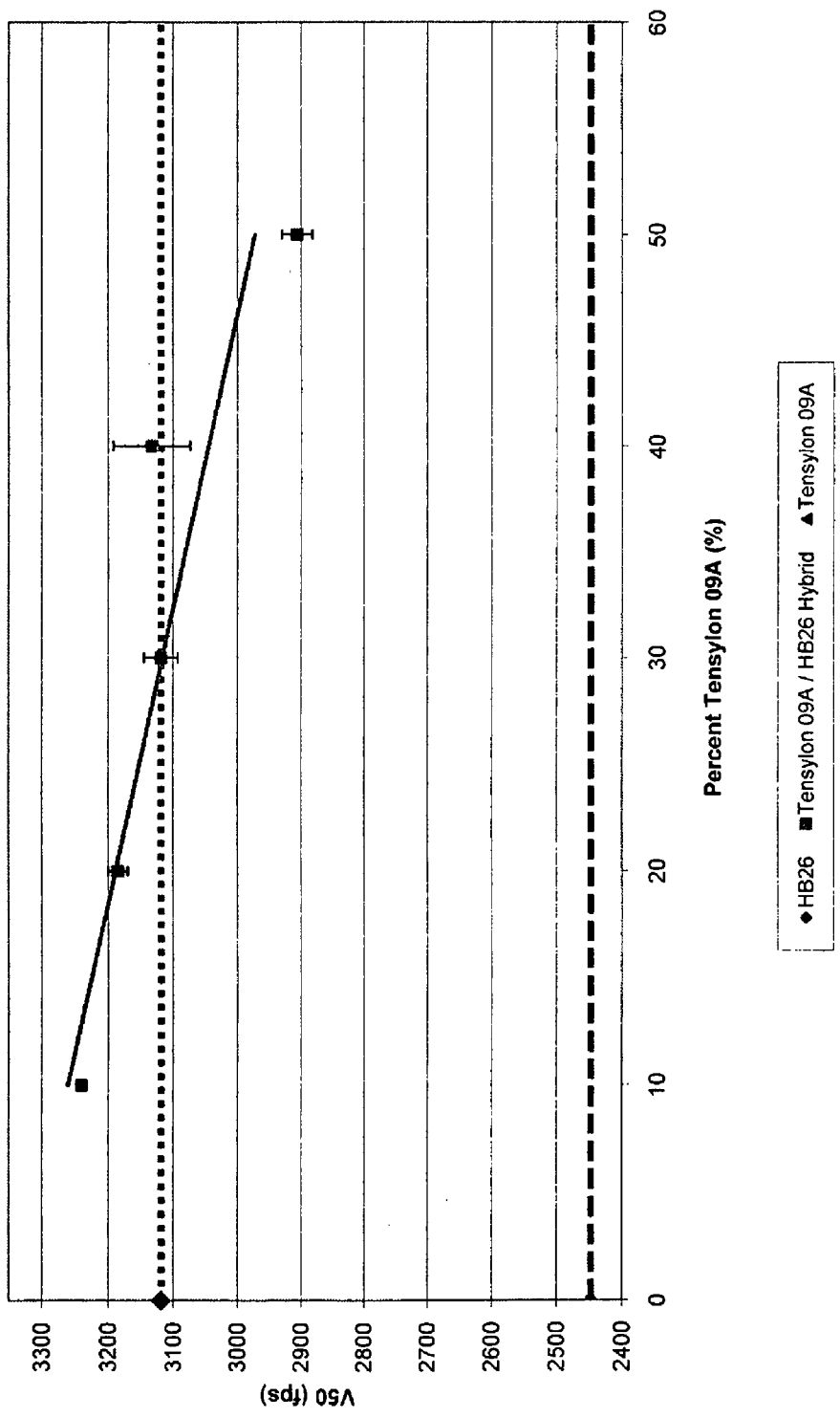

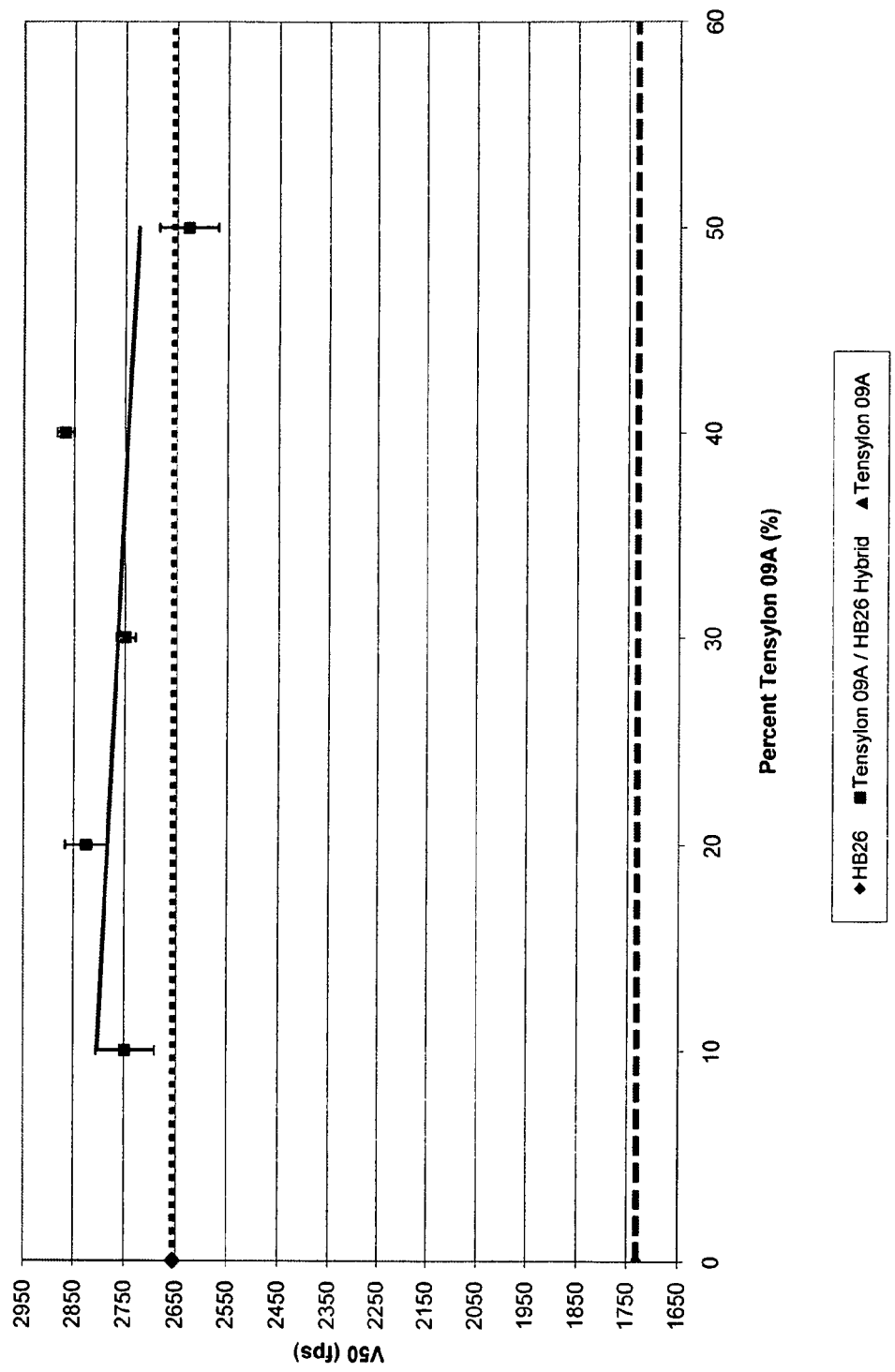

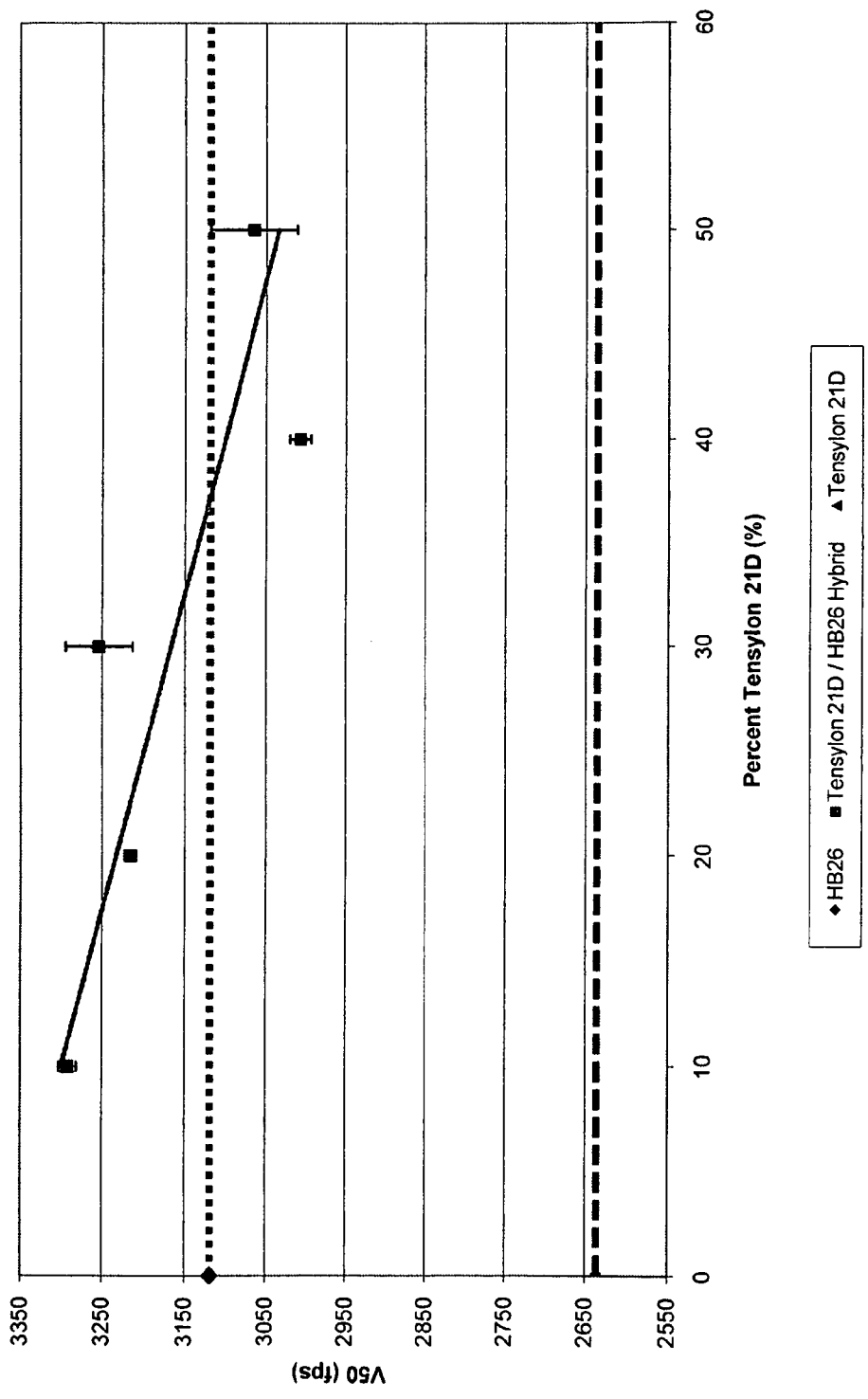

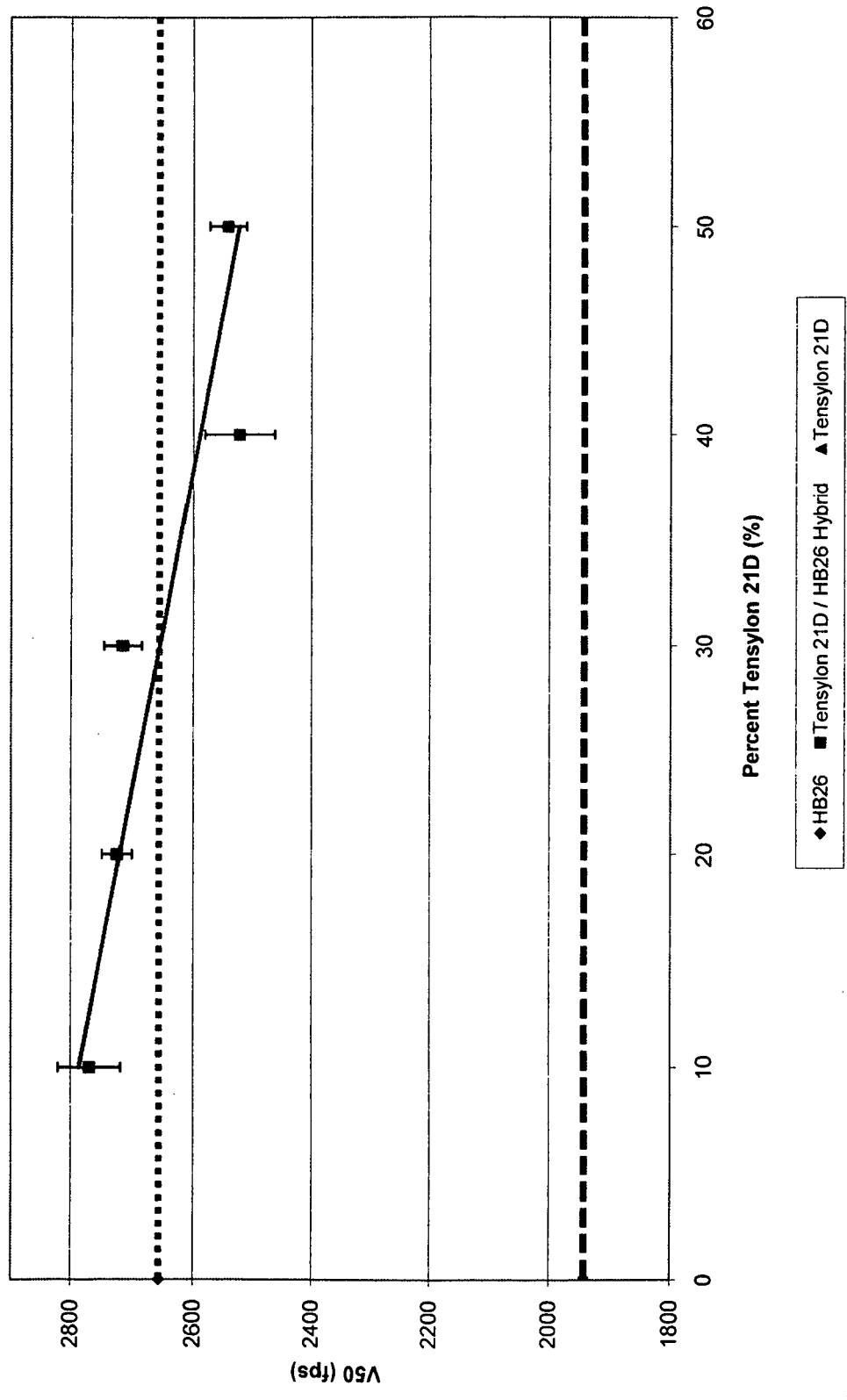

BALLISTIC-RESISTANT PANEL INCLUDING HIGH MODULUS ULTRA HIGH MOLECULAR WEIGHT POLYETHYLENE TAPE

This application is a Continuation-In-Part of U.S. patent application Ser. No. 11/881,863, filed on Jul. 30, 2007 and entitled "Ballistic-Resistant Panel Including High Modulus Ultra High Molecular Weight Polyethylene Tape", which is a Continuation-In-Part of U.S. patent application Ser. No. 11/821,659, filed on Jun. 25, 2007 and entitled "Non-Fibrous High Modulus Ultra High Molecular Weight Polyethylene Tape for Ballistic Applications" and a Continuation-In-Part of U.S. patent application Ser. No. 11/787,094, filed on Apr. 13, 2007 and entitled "Wide Ultra High Molecular Weight Polyethylene Sheet and Method of Manufacture", of which the entire contents of said applications are incorporated herein in their entirety by reference thereto.

FIELD OF THE INVENTION

The present invention relates to survivability enhancement and more particularly to a ballistic resistant panel including a compressed stack of interleaved layers including a strike face formed of a plurality of interleaved layers of non-fibrous ultra high molecular weight polyethylene tape.

BACKGROUND OF THE INVENTION

Survivability enhancement is a well-known objective for armored vehicles or fixed or mobile armored structures in a combat or other high threat environment. If a high-energy projectile strikes a vehicle, the survivability of the occupants and the vehicle can be compromised by the release of spall, which is a spray of high velocity metallic or ceramic debris into the vehicle's interior. Vehicles, ships, aircraft, or structures in a high threat environment are therefore frequently equipped with a spall liner, which is designed to suppress the spall generated when a projectile penetrates the vehicle's interior.

U.S. patent application Ser. No. 11/881,863, filed on Jul. 30, 2007, the entire contents of which are incorporated herein in their entirety by reference thereto, disclosed a ballistic resistant panel that significantly improved threat performance by providing a strike face consisting of a compressed stack of interleaved layers of non-fibrous ultra high molecular weight polyethylene tape. The non-fibrous ultra high molecular weight polyethylene tape was TENSYLON® produced by BAE Systems Tensylon High Performance Materials, Inc., Monroe, N.C. The strike face, which formed at least 25% by weight of the entire panel, was compressed together with a backing layer of cross-plied fibers embedded in resin. Two types of cross-plied fibers were evaluated in the backing layer, including aramid and ultra high molecular weight polyethylene fibers. It was found that several adhesives are acceptable for adhering together cross-plied layers of Tensylon tape and that the level of adhesive required for adhering the layers of Tensylon tape was significantly less than for comparable layers of high modulus fibers.

Although the ballistic resistant panel with improved strike face disclosed in the aforementioned patent application exhibited good resistance against threats, continued tests have provided unexpected advantageous results. These unexpected results indicate that a further reduction in the ratio of strike face containing Tensylon tape, to backing containing high modulus polyethylene fibers, provides an increase in survivability.

SUMMARY OF THE INVENTION

The invention is a ballistic resistant panel including a strike face portion and a backing portion. The strike face portion includes a plurality of interleaved layers of non-fibrous ultra high molecular weight polyethylene tape. The backing portion includes a plurality of interleaved layers of cross-plied fibers of ultra high molecular weight polyethylene. The entire stack of interleaved layers is compressed at high temperature and pressure to form a ballistic resistant panel having a strike face on one side. It has been found that ballistic resistance increases as the weight ratio of the strike face portion with respect to the backing portion decreases. A composite panel having a strike face of Tensylon tape that formed up to 40% of the total weight of the panel exhibited improved ballistic resistance as compared to comparable monolithic structures of interleaved layers of cross-plied high modulus fibers.

Objects and Advantages

A ballistic-resistant panel including a strike face formed of UHMWPE (ultra high molecular weight polyethylene) Tensylon tape according to the present invention includes several advantages over the prior art, including:

(1) Including a strike face of Tensylon tape at a ratio of at most 40% of the total weight of the panel increases ballistic resistance performance as compared to a panel of monolithic fiber structure.

(2) The ballistic performance increases as the ratio of Tensylon tape in the composite panel is decreased.

(3) The UHMWPE Tensylon tape of the present invention can be produced at a substantially lower price than conventional ballistic fibers. Significant cost savings are therefore obtained by replacing a portion of the conventional high modulus component with the high modulus UHMWPE tape of the present invention.

(4) Forming the ballistic-resistant panel or the strike-face portion of monolithic UHMWPE tape reduces or eliminates joints or seams, thereby improving the ballistic resistance of the ballistic laminate. The UHMWPE tape is a monolithic product, formed as a single piece without joints or seams. This monolithic non-fibrous structure leads to significant savings in the production of ballistic laminates as the monolithic structure eliminates stress concentrators that are a significant disadvantage of fibrous UHMWPE.

(5) Forming the strike-face portion of monolithic UHMWPE tape provides structural support to the laminate and reduces delamination after a ballistic event.

(6) Processing time is greatly reduced in forming interleaved layers of high modulus material. The UHMWPE tape of the present invention may be formed into sheets or layers by weaving the wide tapes into a woven structure such as a simple basket weave or by simply butting together the strips of tape edge to edge, or by overlapping the edges slightly, and then pressing with pressure, heat and pressure, or by coating with adhesive and pressing. This is vastly simpler and cheaper than forming a sheet or layer from fibers, which requires thousands of individual fibers per layer and lamination with an adhesive or processing by weaving, knitting, or cross-stitching.

(7) The amount of adhesive required to mold a ballistic laminate with a strike-face according to the present invention is significantly lower than that required for a ballistic laminate formed of conventional ballistic fibers. The smooth surface area of the high modulus tape used in the strike-face portion of the ballistic-resistant panel enables a lower adhesive to UHMWPE ratio than is available with ballistics panels formed from conventional UHMWPE. The effectiveness of conventional ballistic-resistant panels is generally negatively affected by the higher adhesive ratios, as the adhesive portion adds weight to the laminate but does not contribute to the ballistic resistance unless the adhesive is specifically designed to produce controlled delamination.

These and other objects and advantages of the present invention will be better understood by reading the following description along with reference to the drawings.

DESCRIPTION OF THE DRAWINGS

FIG. 6 is a graph depicting ballistic resistance at various molding temperatures and at two separate molding pressures for 2.0 psf panels having 100% Tensylon tape as the high modulus component.

FIG. 7 is a graph depicting ballistic resistance against M80 Ball of a series of 3.8 psf composite panels in which the percentage by weight of the strike face portion formed of a plurality of layers of cross-plied Tensylon high modulus tape varied from 10 to 50%.

FIG. 8 is a graph depicting ballistic resistance against PS Ball of a series of 4.28 psf composite panels in which the percentage by weight of the strike face portion formed of a plurality of layers of cross-plied Tensylon high modulus tape varied from 10 to 50%.

FIG. 9 is a graph depicting ballistic resistance against M80 Ball of a series of 3.8 psf composite panels in which the percentage by weight of the strike face portion formed of a plurality of layers of cross-plied Tensylon high modulus tape varied from 10 to 50%.

FIG. 10 is a graph depicting ballistic resistance against PS Ball of a series of 3.8 psf composite panels in which the percentage by weight of the strike face portion formed of a plurality of layers of cross-plied Tensylon high modulus tape varied from 10 to 50%.

TABLE OF NOMENCLATURE

Figure 1:
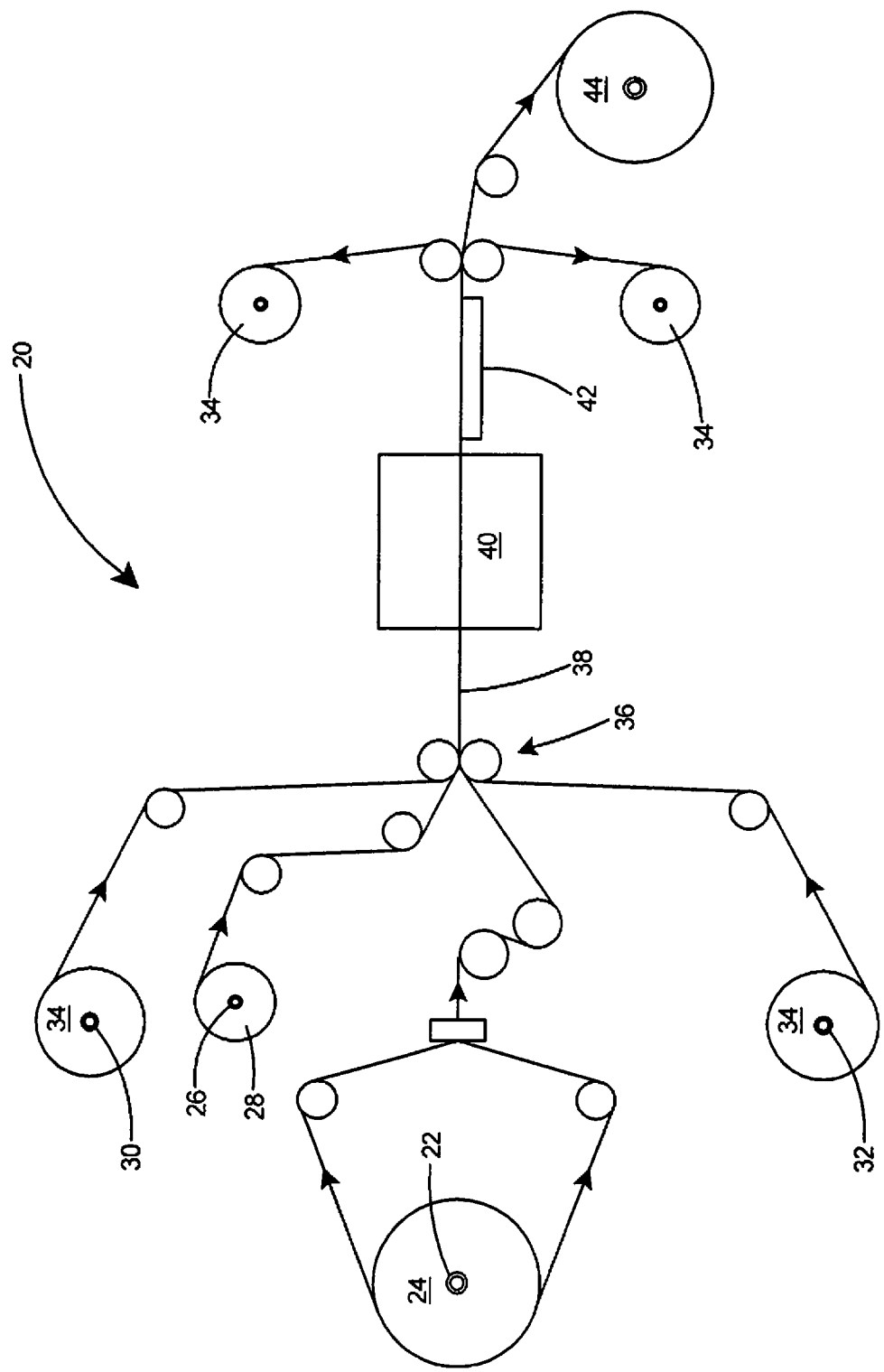
FIG. 1 is a schematic representation of a production process for laminating UHMWPE tape with adhesive in order to produce layers for forming a ballistic laminate according to the present invention.

The following is a listing of part numbers used in the drawings along with a brief description:

| Part Number | Description |
| --- | --- |
| 20 | laminator/fuser |
| 22 | unwind shaft |
| 24 | Tensylon tape |
| 26 | second unwind shaft |
| 28 | adhesive |
| 30 | third unwind shaft |
| 32 | fourth unwind shaft |
| 34 | silicone release paper |
| 36 | nip rolls |
| 38 | adhesive coated Tensylon web |
| 40 | fusing oven |
| 42 | chilled platen |
| 44 | adhesive coated unidirectional tape |
| 50 | laminator/fuser |
| 52 | adhesive coated release roll |
| 54 | release liner |
| 60 | top sheet of adhesive-coated unitape |
| 62 | bottom sheet of adhesive-coated unitape |
| 64 | strip of Tensylon unidirectional tape |
| 66 | joint areas |
| 68 | adhesive layer |
| 70 | cross-plied sheet of adhesive-coated Tensylon |
| 72 | cross-plied sheet of adhesive-coated Tensylon |
| 74 | cross-plied sheet of convention fibers in resin |
| 76 | cross-plied sheet of convention fibers in resin |

DETAILED DESCRIPTION OF THE INVENTION

The present invention relates to ballistic laminates having a plurality of layers of high modulus material, either all or some portion of which layers are constructed of non-fibrous, high modulus, ultra high molecular weight polyethylene tape of the type described in U.S. patent application Ser. No. 11/787,094, filed on Apr. 13, 2007, the contents of which are incorporated herein in their entirety by reference thereto. The non-fibrous, high modulus, UHMWPE tape is produced by BAE Systems Tensylon High Performance Materials, Inc. of 1901 Piedmont Drive, Monroe, N.C., and sold under the name TENSYLON®. As used in this application, the term "high modulus" refers to materials having a modulus greater than 1,000 grams per denier (gpd). The non-fibrous UHMWPE tape is obtained by compression molding ultrahigh molecular weight polyethylene powder at a temperature below its melting point and then calendering and drawing and the resultant compression molded polyolefin at a total draw ratio of at least 100:1. The high modulus UHMWPE tape may include a width of 1.0 inch and a thickness of 0.0025 inch, which indicates a width to thickness ratio of 400:1. The UHMWPE tape can be produced in weights from 6,000 denier to 90,000 denier and higher.

In order to form an improved strike-face for a ballistic-resistant panel according to the present invention, adhesive was applied to one side of a plurality of webs of unidirectional UHMWPE tape. The webs of adhesive-coated unitape were bonded into a unidirectional or unitape sheet, sheeted, and then cross-plied with additional sheets of adhesive-coated unitape. The cross-plied sheets were molded by heat and pressure into a ballistic laminate. Several conventional adhesives were tested for their effectiveness in forming a ballistic laminate. The test procedure included the following steps:

(1) Comparing various adhesives for bonding UHMWPE tape for the purpose of forming unidirectional material for use in bidirectional cross ply;

(2) Evaluating unidirectional tape lamination capability and consolidation capability;

(3) Forming each adhesive variant into a nominal 2.0 pounds per square foot (psf) test panel at 150 psi and into a second 2.0 psf panel at 3000 psi; and (4) Testing the resultant test panels for ballistic performance.

In order to test the effectiveness of TENSYLON® non-fibrous, high modulus UHMWPE tape as a high modulus component in ballistic-resistant panels, adhesive was applied to one side of Tensylon 19,000 denier tape, hereinafter "Tensylon tape". The 19,000 denier Tensylon tape included nominal dimensions of 1.62 inches in width, 0.0025 inch in thickness, and a tensile modulus of at least 1,400 grams per denier (gpd). Some of the adhesives were in the form of adhesive scrims, which were laminated to one side of the Tensylon tape, and others were resinous adhesive dispersed in a solvent, which was coated on a release film and then transferred to one side of the Tensylon tape. Preferably, the Tensylon tape has viscosity-average molecular weight of at least 2,000,000, a width of at least 1.0 inch, a thickness of between 0.0015 and 0.004 inch, a width to thickness ratio of at least 400:1, a denier of 6,000 or greater, and a modulus of greater than 1,400 grams per denier.

With reference to FIG. 1, there is shown a laminator/fuser 20 for laminating adhesive scrims to the Tensylon tape. The laminator/fuser 20 included an unwind shaft 22 with eight rolls of 1.62-inch wide Tensylon tape 24 assembled thereon. Each roll included independent brake tension controls. A second unwind shaft 26 contained a roll of adhesive 28. A third unwind shaft 30 and forth unwind shaft 32 contained rolls of silicone release paper 34. The Tensylon tape 24, adhesive 28, and silicone release paper 34 were laminated together at nip rolls 36 thereby forming adhesive coated Tensylon web 38 sandwiched between the two silicone release liners 34. The silicone release liners 34 prevented the adhesive coated Tensylon web 38 from sticking to any rollers in the oven during fusing. The adhesive coated Tensylon web 38 was then conveyed through a fusing oven 40 to cure the thermoplastic adhesive. A chilled platen 42 cooled the Tensylon/adhesive laminate 38 as it exited the fusing oven 40. After cooling, the release liners 34 were removed from the Tensylon/adhesive laminated web 38 thereby formed an adhesive-coated roll of unidirectional Tensylon 44 at a nominal width of 13.0 inches. The laminator/fuser operated at a line speed of 10 to 20 feet per minute and with fusing oven 40 temperatures between 230° F. and 260° F.

Figure 2:
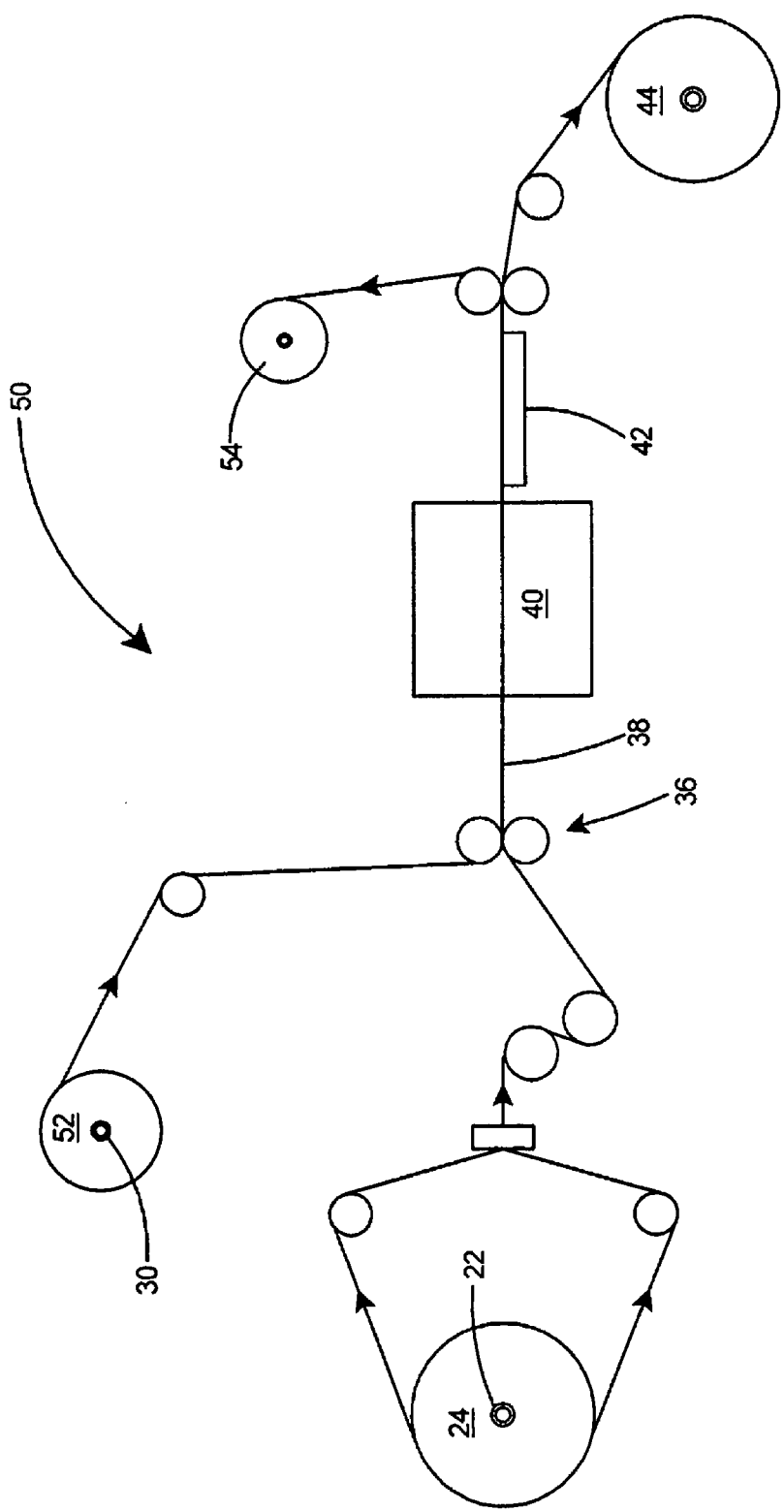
FIG. 2 is a schematic representation of a second production process for laminating UHMWPE tape with adhesive for the production of a ballistic laminate according to the present invention.

For those adhesives in the form of a resin suspended in a solvent, the resin was applied to one side of a silicone release sheet. With reference to FIG. 2, there is shown a laminator/fuser 50 in which the adhesive-coated silicone release roll 52 was mounted on an unwind shaft 30 with Tensylon tape 24 on unwind shaft 22. The adhesive-coated silicone release web 52 was then nipped against the 1.62-inch wide Tensylon webs that were butt-jointed together at the nip 36. At the nip 36 the adhesive was transferred to the Tensylon web and the eight 1.62-inch Tensylon webs were fused into one sheet as has been described in U.S. patent application Ser. No. 11/787,094, filed Apr. 13, 2007, the contents of which are incorporated herein in their entirety by reference thereto. The adhesive-coated Tensylon 38 was then conveyed through the remainder of the laminator/fuser 50 and the release liner 54 removed from the 13.0-inch nominal width Tensylon/adhesive-coated web 38.

The specific adhesives tested and significant measured properties are presented in Table 1 below:

TABLE 1

Adhesives Tested for effectiveness in bonding Tensylon tape into a ballistic laminate:

| Adhesive Code | Chemical Composition | Melt Temperatures (degrees C.) | Measured Coat Weight (gsm) |
|---|---|---|---|
| A1 | Polyamide | 100-115 | 6.2 |
| B1 | Polyolefin | 93-105 | 6.0 |
| C1 | Ethylene Vinyl Acetate Copolymer | 98-112 | 4.7 |
| D1 | Polyurethane | 70-100 | 16.7 |
| E1 | Ethylene Acrylic Acid Copolymer | 88-105 | N/A |
| F1 | Polystyrene Isoprene Copolymer | N/A | 6.0 |
| G1 | Polyamide | N/A | 5.0 |
| H1 | Polyurethane | N/A | 5.0 |

The adhesives tested included Polyethylene-PO4401 (A1), Polyethylene-PO4605 (B1), Polyethylene-DO184B (C1), Polyurethane-DO187H (D1), and Polyethylene-DO188Q (E1), which are all available from Spunfab, Ltd. of Cayahoga Falls, Ohio; Kraton D1161P (F1), which is available from Kraton Polymers U.S., LLC of Houston, Tex.; Macromelt 6900 (G1), which is available from Henkel Adhesives of Elgin, Ill.; and Noveon-Estane 5703 (H1), which is available from Lubrizol Advanced Materials, Inc. of Cleveland, Ohio. Adhesives A1 through E1 were applied to the Tensylon tape by the laminator/fuser 20 depicted in FIG. 1. Adhesives F1 through H1, which were dispersed in solvents, were coated on a release film and then transferred to one side of the Tensylon tape.

Figure 3:
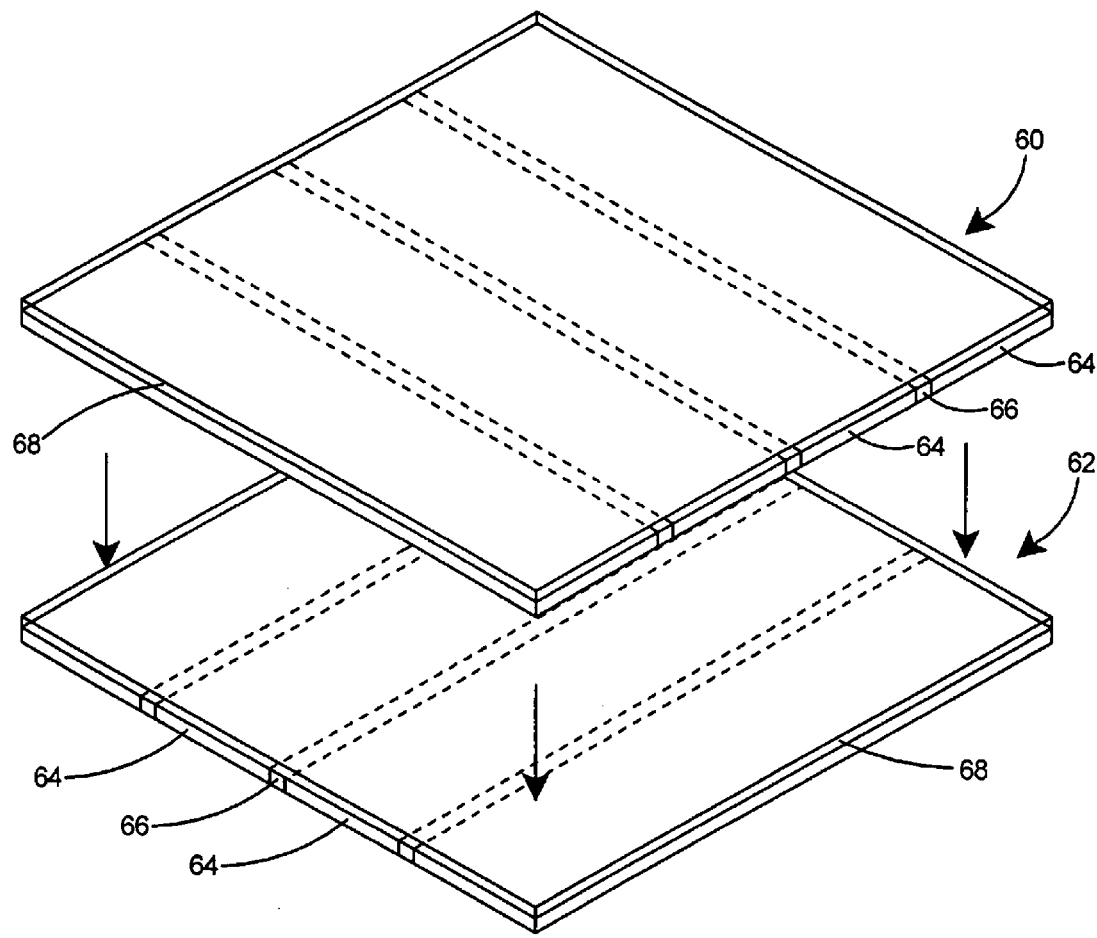
FIG. 3 is a schematic representation in perspective view of two sheets or layers of adhesive-coated unidirectional non-fibrous UHMWPE tape prior to being fused together with heat and pressure to form a cross-plied laminate for use in the construction of a ballistic laminate according to the present invention.
Figure 4:
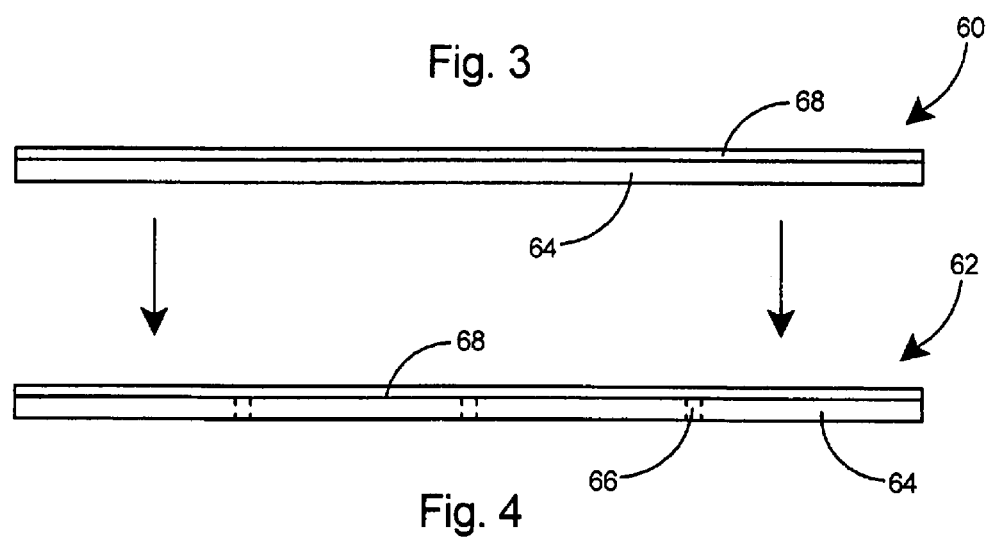
FIG. 4 is a schematic representation as viewed from the side of two sheets of unidirectional non-fibrous UHMWPE tape prior to being fused together with heat and pressure to form a cross-plied laminate.

The adhesive-coated unidirectional Tensylon tape, commonly termed "unitape" and consisting of eight strips of UHMWPE tape fused at their edges, was then cut into 12-inch by 12-inch sheets. FIGS. 3 and 4 depict two sheets 60 and 62 of adhesive-coated unitape consisting of strips of Tensylon UHMWPE tape 64 fused at joint areas 66. The joint areas 66 are depicted for clarity in describing the direction of orientation of the UHMWPE tape in FIG. 3, it should be understood that the UHMWPE tape strips 64 are rendered substantially transparent when bonded as described herein therefore making the joint areas 66 appear homogenous with the sheet. The bonding of non-fibrous, high modulus, ultra high molecular weight polyethylene Tensylon tape is described in detail in U.S. patent application Ser. No. 11/787,094, filed on Apr. 13, 2007, which has been incorporated herein by reference. The top sheet 60 of adhesive-coated unitape is oriented at 90° with respect to the bottom sheet 62. An adhesive layer 68, shown as a transparent layer of adhesive in FIGS. 3 and 4, is bonded to each sheet 60, 62 in the manner described above. As the adhesive is thermoplastic, the two sheets 60, 62 of adhesive-coated unitape are pressed together with heat and pressure which causes the two sheets to bond together into a cross-plied sheet of Tensylon UHMWPE with the bonded sheets cross-plied in the 0° and 90° direction.

To form a ballistic-resistant panel, cross-plied sheets of adhesive-coated Tensylon were stacked until a stack of cross-plied Tensylon of approximately 2.0 psf (pounds per square foot) was obtained. Several of the nominal 2.0 psf stacks were pressed at a pressure of 150 psi and several at a pressure of 3,000 psi. The press cycle included 30 minutes at a temperature of 250° F. to 260° F. and cooling under full pressure to below 120° F. before release thereby forming ballistic-resistant panels of nominally 2.0 psf areal density.

Figure 5:
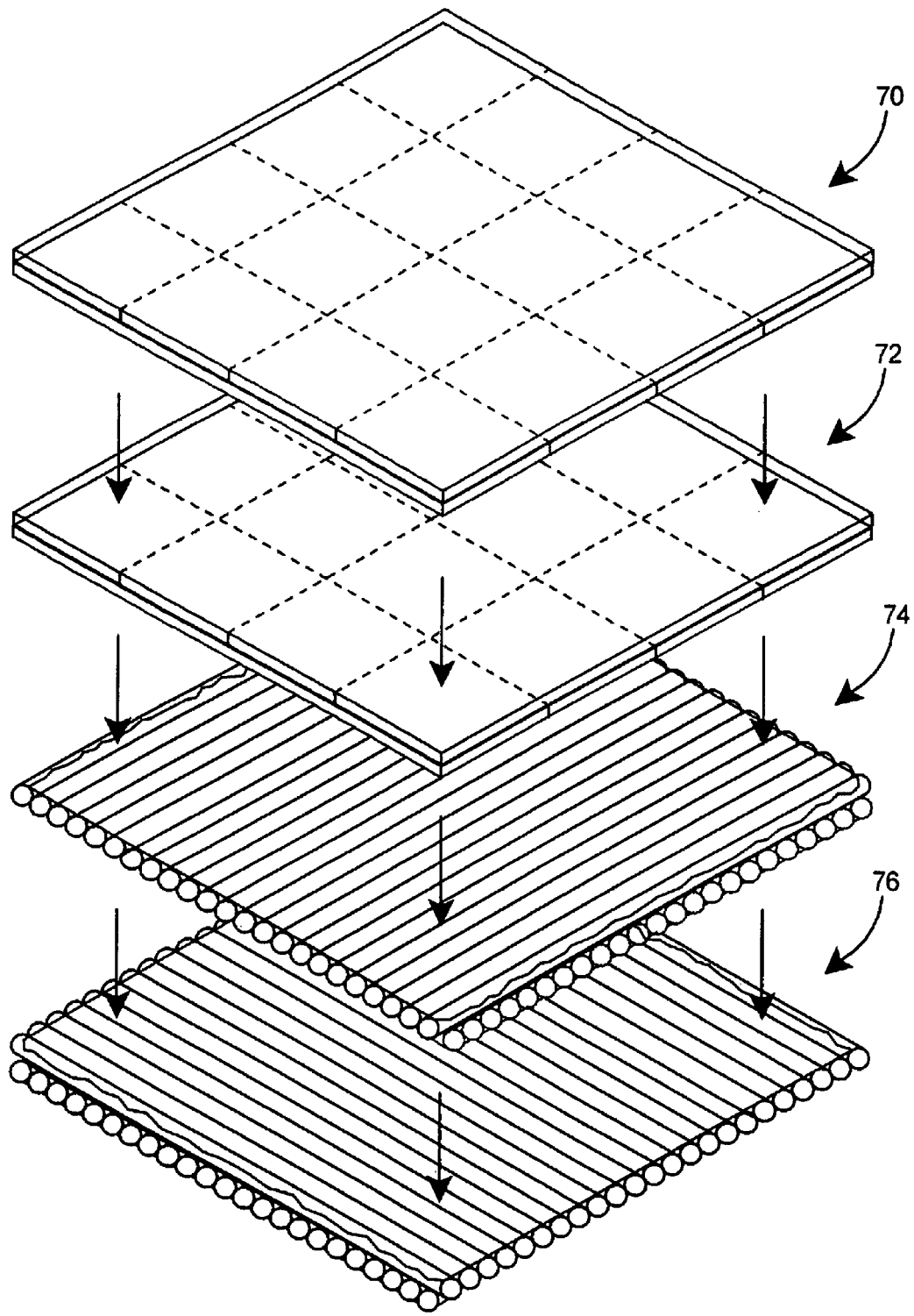
FIG. 5 is an illustration depicting the forming of a ballistic-resistant panel with cross-plied sheets of adhesive-coated Tensylon and cross-plied sheets of conventional high modulus fibers embedded in resin.

With reference to FIG. 5, a simplified illustration depicts the forming of the preferred embodiment of a ballistic-resistant panel with cross-plied sheets or laminates of adhesive-coated Tensylon 70 and 72 and cross-plied sheets of conventional high modulus fibers embedded in resin 74 and 76. The cross-plied sheets of adhesive-coated Tensylon 70 and 72 are stacked on top of stacked cross-plied sheets of conventional high modulus fibers 74 and 76 and pressure and heat are applied to bond the sheets into a ballistic-resistant panel. As an example, to form a 2.0 psf ballistic-resistant panel having a 50/50 ratio by weight of Tensylon and conventional fiber, a plurality of sheets of cross-plied conventional fibers embedded in resin are laid down until a weight of approximately 2.0 psf is obtained. Cross-plied sheets of adhesive-coated Tensylon are then stacked on top of the cross-plied sheets of conventional high modulus fibers until a total weight of approximately 2.0 psf was obtained. Heat and pressure are then applied to fuse the cross-plied layers of Tensylon and conventional fibers into a ballistic-resistant panel.

The ballistic-resistant panels were then tested for ballistic resistance. Projectiles of 0.30 caliber FSP (Fragment Simulated Projectile) per MIL-P-46593A were fired at the 2.0 psf test panels to obtain ballistics properties of the panels bonded with the various adhesives. The velocities in fps (feet per second) at which 50% of the projectiles failed to penetrate the target ($V_{50}$) were determined per MIL-STD-662F. Data for the resultant ballistic-resistant panels formed at 150 psi are shown in Table 2 and data for the resultant ballistic-resistant panels formed at 3,000 psi are shown in Table 3 below:

TABLE 2

Data Results for Ballistic-resistant panels of UHMWPE tape formed with various adhesives at Molding Pressure 150 psi and Ballistic Test Results:

| Adhesive Description | Adhesive ID | Adhesive Weight (gsm) | Adhesive (wt %) | Areal Density (psf) | Average 0.30 Cal FSP $V_{50}$ (fps) |
|---|---|---|---|---|---|
| A1 | Polyamide | 5.93 | 10.4 | 2.01 | 1873 |
| A1 | Polyamide | 3.10 | 5.7 | 1.88 | 1984 |
| C1 | Ethylene Vinyl Acetate Copolymer | 5.93 | 10.4 | 2.03 | 1957 |
| D1 | Polyurethane | 15.25 | 22.9 | 2.02 | 1818 |
| E1 | Ethylene Acrylic Acid Copolymer | 5.93 | 10.4 | 2.02 | 1832 |
| B1 | Polyolefin | 5.93 | 10.4 | 2.01 | 1937 |
| B1 | Polyolefin | 3.10 | 5.7 | 2.05 | 1878 |
| F1 | Polystyrene-Isoprene Copolymer | 7.40 | 12.6 | 2.01 | 2057 |
| F1 | Polystyrene-Isoprene Copolymer | 5.70 | 10.0 | 2.07 | 2124 |
| Dyneema HB2 | Polystyrene-Isoprene | — | — | 1.99 | 2275 |
| Dyneema HB25 | Polyurethane | — | — | 2.00 | 2192 |

TABLE 3

Data Results for Ballistic-resistant panels of UHMWPE tape formed with various adhesives at Molding Pressure 3,000 psi and Ballistic Test Results:

| Adhesive Description | Adhesive ID | Adhesive Weight (gsm) | Adhesive (wt %) | Areal Density (psf) | Average 0.30 Cal FSP $V_{50}$ (fps) |
|---|---|---|---|---|---|
| A1 | Polyamide | 5.93 | 10.4 | 1.94 | 1915 |
| C1 | Ethylene Vinyl Acetate Copolymer | 5.93 | 10.4 | 1.96 | 1963 |
| B1 | Polyolefin | 5.93 | 10.4 | 1.96 | 2014 |
| B1 | Polyolefin | 3.10 | 5.7 | 2.02 | 1970 |
| F1 | Polystyrene-Isoprene Copolymer | 7.40 | 12.6 | 2.03 | 2242 |
| F1 | Polystyrene-Isoprene Copolymer | 5.70 | 10.0 | 2.02 | 2136 |
| Dyneema HB2 | Polystyrene-Isoprene | — | — | 2.00 | 2541 |
| Dyneema HB25 | Polyurethane | — | — | 2.00 | 2386 |

A summary of the data suggest that the 3000 psi ballistic-resistant panels molded with adhesives A1, B1, and C1 rated slightly higher for ballistic performance than did the 150 psi panels. Adhesives B1 and C1 were essentially equal in performance. The $V_{50}$ results suggest that all of the test panels were acceptable for ballistic resistance of 0.30 caliber fragment simulated projectiles.

Ballistic-resistant panels were then prepared to test the performance of Tensylon tape versus conventional high modulus fibers. DYNEEMA® HB25 cross-plied fibers embedded in resin, available from DSM Dyneema B.V., Urmond, the Netherlands, were formed into a 2.0-psf panel. A panel formed of 100% HB25 as the high modulus component was used as a control sample or baseline. A nominal 2.0-psf panel was also formed of 100% high modulus Tensylon tape. Various other combinations of Tensylon tape and HB25 were formed into ballistic-resistant panels to test the ballistic resistance of panels with various amounts of Tensylon tape in place of the conventional high modulus component and to also test whether the Tensylon tape was more effective in various configurations, such as 1) alternating sheets of Tensylon tape and conventional high modulus component, 2) Tensylon tape as a strike-face at the front of the ballistic-resistant panel, and 3) Tensylon tape as the backing material with conventional high modulus component forming the strike face, and 4) varying the ratio of Tensylon tape to conventional high modulus component. Several of these variations were molded into panels at 150 psi and 250° F. as shown in Table 4 below, and several molded into panels at 150 psi and 210° F. as shown in Table 5. The ballistic-resistant panels were tested with 0.30 caliber FSP rounds and the $V_{50}$ results recorded.

Table 4 includes, left to right in columns 1 to 7:1) the high modulus composition, 2) the baseline $V_{50}$ test result for panels formed of one high modulus component, 3) the $V_{50}$ test result for panels formed with a Tensylon strike-face, 4) the $V_{50}$ test result for panels formed with HB25 as the strike-face, 5) the calculated $V_{50}$, and 6) the delta $V_{50}$ which is the difference between the calculated $V_{50}$ and the actual $V_{50}$ recorded in columns 3, 4, or 5. The calculated $V_{50}$ is determined by the Rule of Mixtures wherein the property of a composite is proportional to the volume fractions of the materials in the composite, thus the calculated $V_{50}$ for a 50/50 ratio of Tensylon C and HB25 is $V_{50=0.5}$ (1650)+0.5 (2250) or $V_{50}$ (calculated)=1950. The Tensylon C (Ten C) and Tensylon A (Ten A) were panels molded with different levels of polyolefin adhesive. Tensylon A (Ten A) included 5.7% by weight of polyolefin adhesive and Tensylon C (Ten C) included 10.4% by weight of polyolefin adhesive.

Thus, if the Delta $V_{50}$ is within plus or minus 50 fps, the Rule of Mixtures is a good predictor of the final $V_{50}$ value, and there is no effect from the manner in which the separate high modulus components are combined in the panel. Thus the $V_{50}$ for alternating layers of Tensylon tape and HB25, which is represented by line 4 of the table, is predicted by the Rule of Mixtures. However, if the absolute value of the Delta $V_{50}$ is significantly greater than 50 fps for several of the test panels, it implies that the order in which the high modulus components are arranged in the ballistic-resistant panel is statistically significant. Thus, where the Tensylon tape is placed with respect to front or back in the ballistic-resistant panel has a significant effect on the ballistic performance of the panel. A Delta $V_{50}$ that is greater than +50 fps indicates a higher ballistic resistance result than expected by the Rule of Mixtures and thus an advantageous configuration of high modulus components within the panel. A Delta $V_{50}$ that is less than −50 fps indicates a lower ballistic resistance result than expected by the Rule of Mixtures and thus an undesirable configuration of high modulus components within the panel.

Therefore, it can be concluded from the test results in Table 4 that the compositions in rows 5 and 10 through 12 are advantageous for producing a panel with high ballistic resistance. Column 1 shows the high modulus composition of these panels are 25% Tensylon/50% HB25/25% Tensylon (panel 5), 25% Tensylon/75% HB25 (panels 10 and 11), and 50% Tensylon/50% HB25 (panel 12). Results therefore show that a strike-face consisting of high modulus UHMWPE Tensylon tape improves the performance of ballistic-resistant panels. In the final ballistic-resistant panel, the adhesive was less than 20 weight percent of the total weight of the panel.

TABLE 4

Test Results of 2.0 psf Ballistic-resistant panels at Molding Pressure 150 psi and 250° F. Temperature:

| High Modulus Component | Ratio (%) | Baseline 0.30 cal. $V_{50}$ (fps) | Tensylon Front $V_{50}$ (fps) | Tensylon Back $V_{50}$ (fps) | Calculated $V_{50}$ (fps) | Delta $V_{50}$ (fps) |
|---|---|---|---|---|---|---|
| HB25 | 100 | 2250 | — | — | — | — |
| Tensylon C | 100 | 1650 | — | — | — | — |
| Tensylon A | 100 | 1933 | — | — | — | — |
| TenC/HB25 alt.* | 50/50 | — | 1965 | — | 1950 | +15 |
| TenC/HB25/TenC | 25/50/25 | — | 2211 | — | 1950 | +261 |
| HB25/TenC/HB25 | 25/50/25 | — | — | 1989 | 1950 | +39 |
| HB25/TenA | 50/50 | — | — | 1933 | 2092 | −159 |
| HB25/TenC | 50/50 | — | — | 1750 | 1950 | −200 |
| HB25/TenC | 75/25 | — | — | 1852 | 2101 | −249 |
| TenC/HB25 | 25/75 | — | 2333 | — | 2101 | +232 |
| TenA/HB25 | 25/75 | — | 2255 | — | 2151 | +104 |
| TenC/HB25 | 50/50 | — | 2217 | — | 1950 | +267 |

TenC/HB25 alt.* - alternating layers of Tensylon C and HB25.

Table 5 includes ballistic test results for panels of various compositions of Tensylon UHMWPE tape and HB25 fibers molded at 150 psi and 210° F. The ballistic-resistant panels were tested with 0.30 caliber FSP rounds and the $V_{50}$ velocities recorded.

TABLE 5

Test Results of 2.0 psf Ballistic-resistant panels at Molding Pressure 150 psi and 210° F. Temperature:

| High Modulus Component | Ratio (%) | Baseline 0.30 cal. $V_{50}$ (fps) | Tensylon Front $V_{50}$ (fps) | Tensylon Back $V_{50}$ (fps) | Calculated $V_{50}$ (fps) | Delta $V_{50}$ (fps) |
|---|---|---|---|---|---|---|
| HB25 | 100 | 2154 | — | — | — | — |
| Tensylon A | 100 | 1986 | — | — | — | — |
| HB25/TenA | 50/50 | — | — | 1909 | 2070 | −161 |
| TenA/HB25 | 50/50 | — | 2289 | — | 2070 | +219 |
| TenA/HB25 | 25/75 | — | 2300 | — | 2112 | +188 |

As reference to Table 5 shows, the ballistic resistance for the 2.0 psf panels molded at 150 psi and 210° F. was improved significantly with Tensylon UHMWPE tape used as the strike face of the panel. The improvement in ballistic resistance with the addition of Tensylon tape as the strike face therefore occurred with panels molded at 250° F. (Table 4) as well as at 210° F. (Table 5).

Table 6 includes ballistic test results for 3.8 nominal psf ballistic-resistant panels composed of Tensylon UHMWPE tape and aramid fabric molded with SURLYN® resin at 150 psi and 250° F. SURLYN® is an ethylene/methacrylic acid copolymer available from DuPont Packaging and Industrial Polymers of Wilmington, Del. The aramid fabric is produced commercially by Barrday, Inc. under the trade name Barrday Style 1013. The aramid fabric was composed of 3,000 denier Kevlar® 29 in fabrics of 14 oz/yd² weight. One ply of 1.5-mil CAF film (SURLYN® resin) was used between each ply of Tensylon tape. (As a result of aramid fabric and Tensylon tape weight variances, it was difficult to match areal densities. The ballistic-resistant panels were tested with 0.30 caliber FSP rounds and the $V_{50}$ velocities recorded.

TABLE 6

Test Results of 3.3 psf Ballistic-resistant panels at Molding Pressure 150 psi and 250° F. Temperature:

| High Modulus Component | Ratio (%) | Baseline 0.30 cal. $V_{50}$ (fps) | Tensylon Front $V_{50}$ (fps) | Tensylon Back $V_{50}$ (fps) | Calculated $V_{50}$ (fps) | Delta $V_{50}$ (fps) |
|---|---|---|---|---|---|---|
| Aramid | 100 | 2491 | — | — | — | — |
| Tens/Ara alt.* | 50/50 | 2320 | — | — | 2405 | −85 |
| Tens/Ara | 50/50 | — | 2632 | — | 2405 | +227 |
| Ara/Tens | 50/50 | — | — | 2275 | 2405 | −130 |

Tens/Ara alt.* - alternating layers of Tensylon and Aramid.

As shown in Table 6, the test panel with a Tensylon tape strike face had ballistic resistance of 2632 fps, which was significantly higher than that predicted by the Rule of Mixtures.

Table 7 includes ballistic test results for 3.8 nominal psf ballistic-resistant panels composed of Tensylon UHMWPE tape and HB25 and tested with an NIJ Level III M80 ball projectile (U.S. military designation for 7.62 mm full metal jacketed bullet).

TABLE 7

Test Results - 3.8 psf Ballistic-resistant panels, M80 Ball:

| High Modulus Component | Ratio (%) | Molding Pressure (psi) | Areal Density (psf) | Calculated M80 ball $V_{50}$ (fps) | M80 ball $V_{50}$ (fps) | Delta $V_{50}$ (fps) |
|---|---|---|---|---|---|---|
| HB25 | 100 | 150 | 4.01 | — | 2965 | — |
| Tensylon | 100 | 150 | 4.00 | — | 2107 | — |

TABLE 7-continued

Test Results - 3.8 psf Ballistic-resistant panels, M80 Ball:

| High Modulus Component | Ratio (%) | Molding Pressure (psi) | Areal Density (psf) | Calculated M80 ball $V_{50}$ (fps) | $V_{50}$ M80 ball (fps) | Delta $V_{50}$ (fps) |
|---|---|---|---|---|---|---|
| Tens/HB25 alt.* | 50/50 | 150 | 3.80 | 2565 | 2416 | −149 |
| Tensylon/HB25 | 50/50 | 150 | 3.85 | 2565 | 2880 | +315 |
| Tensylon/HB25 | 25/75 | 150 | 3.85 | 2750 | 2897 | +147 |

Tens/HB25 alt.* - alternating layers of Tensylon and HB25.

As shown in Table 7 for nominal 3.8 psf composite ballistic-resistant panels, the Tensylon UHMWPE tape had a beneficial effect when placed as the strike-face of the ballistic-resistant panel, including a V50 velocity of 2880 fps for the ballistic-resistant panel in which the Tensylon tape comprised the strike-face and 50% of the high modulus component and a V50 velocity of 2897 fps for the ballistic-resistant panel in which the Tensylon tape comprised the strike-face and 25% of the high modulus component.

Table 8 includes ballistic test results for a spall liner for simulated armor with facings of aluminum and High Hardness Steel (HHS) and various backing compositions including various weights of HB25 and various compositions including HB25 and Tensylon tape. All of the armor designs including Tensylon tape as a high modulus component had positive results for rifle threat relative to the requirement.

TABLE 8

Ballistic Data Summary - Spall Liner:

| Armor Design | | Total AD | Rifle Threat Relative to Rqmt.* | Frag.** Threat Relative to Rqmt. |
|---|---|---|---|---|
| Facing | Backing | (psf) | (fps) | (fps) |
| 1" 6061 Al/¼" HHS | 2.5 psf HB25 | 27.2 | +232 fps | Not tested |
| | 3.0 psf HB25 | 27.7 | −42 | Not tested |
| | 3.5 psf HB25 | 28.2 | +419 | Not tested |
| | 1.25 psf Ten/ 1.25 psf HB25 | 27.2 | +152 | Not tested |
| | 1.50 psf Ten/ 1.50 psf HB25 | 27.7 | +144 | Not tested |
| | 1.75 psf Ten/ 1.75 psf HB25 | 28.2 | +564 | +1000 |
| 1.5" 6061 Al/¼" HHS | 1.30 psf HB25 | 33.1 | +412 | Not tested |
| | 1.25 psf Ten/ 1.25 psf HB25 | 33.1 | >+464 | Not tested |
| | 1.60 psf Ten | 33.4 | +390 | +1639 |

*Rqmt.—Requirement.
**Frag.—Fragmentation

Table 9 includes ballistic test results for a simulated spall liner including the following various configurations: 1) a baseline configuration of ¼" Ultra High Hard Steel (UHHS) and 1.1 psf of KEVLAR® Reinforced Plastic (KRP), 2) baseline plus 25-mm of HB25 spaced 25-mm behind the KRP, 3) baseline plus 25-mm of high modulus components comprised of 25% Tensylon and 75% HB25 spaced 25-mm behind the KRP, and 4) baseline plus 25-mm of high modulus components comprised of 50% Tensylon and 50% HB25 spaced 25-mm behind the KRP. Test results included the spall cone angle measured at layers 1 and 3 and the average number of fragments that penetrated at layers 1 and 3. The spall cone angle and average number of fragments through for a spall liner including 25% and 50% Tensylon tape were similar to those obtained for a spall liner of 100% HB25.

TABLE 9

Ballistic Data Summary - Simulated Spall Liner, 20 mm FSP:

| Material | Spall Cone Angle (degrees) | | Average # of Fragments Through | |
|---|---|---|---|---|
| | Layer 1 | Layer 3 | Layer 1 | Layer 3 |
| Baseline Configuration: ¼" UHHS + 1.1 psf KRP | 66.44 | 61.70 | 214.5 | 35.0 |
| Baseline with: 25-mm HB25 spaced 25-mm behind KRP | 51.12 | 35.04 | 88.50 | 11.0 |
| Baseline with: 25-mm 25% Tens/75% HB25 spaced 25-mm behind KRP | 56.46 | 36.75 | 89.50 | 10.5 |
| Baseline with: 25-mm 50% Tens/50% HB25 spaced 25-mm behind KRP | 52.58 | 32.57 | 103.0 | 9.0 |

In another embodiment, ballistic-resistant panels were constructed using Tensylon tape as the high modulus component to determine the effect of molding pressure and temperature on ballistic resistance. Table 10 includes ballistic test results for 2.0 psf panels comprised of cross-plied layers of 1.62-inch width Tensylon UHMWPE tape, with a first series of panels molded at 150 psi and at various temperatures and a second series of panels molded at 500 psi and at various temperatures. The cross-plied layers of Tensylon UHMWPE tape were interleaved with a low density polyolefin scrim (Spunfab PO4605) and pressed and bonded at the various pressures and temperatures recorded in the table. The last entry in Table 10, Tensylon*, was comprised of layers of 1.62-inch Tensylon tape woven into a fabric using a basket weave with the weft arranged at 90° with respect to the warp. The woven layers were pressed with an 18-micron low density polyethylene film to form a 2.2 psf ballistic-resistant panel. The ballistic-resistant panels were tested with 0.30 caliber FSP rounds per MIL-P-46593A and the average $V_{50}$ velocities recorded.

TABLE 10

Test Results of 2.0 psf Ballistic-resistant panels at Molding Pressures 150 psi and 500 psi and at various Temperatures:

| High Modulus Component | Molding Pressure (psi) | Temperature (degrees F.) | Average $V_{50}$ (fps) |
|---|---|---|---|
| Tensylon B1 | 150 | 200 | 1601 |
| Tensylon B1 | 150 | 210 | 1702 |
| Tensylon B1 | 150 | 220 | 1630 |
| Tensylon B1 | 150 | 230 | 1689 |
| Tensylon B1 | 150 | 240 | 1611 |
| Tensylon B1 | 150 | 250 | 1634 |
| Tensylon B1 | 150 | 260 | 1577 |
| Tensylon B1 | 150 | 270 | 1543 |
| Tensylon B1 | 150 | 280 | 1551 |
| Tensylon B1 | 500 | 180 | 1790 |
| Tensylon B1 | 500 | 190 | 1717 |
| Tensylon B1 | 500 | 200 | 1692 |
| Tensylon B1 | 500 | 210 | 1647 |
| Tensylon B1 | 500 | 220 | 1588 |
| Tensylon B1 | 500 | 230 | 1593 |
| Tensylon B1 | 500 | 240 | 1566 |
| Tensylon B1 | 500 | 250 | 1649 |
| Tensylon B1 | 500 | 260 | 1703 |
| Tensylon* | 500 | 250 | 1826 |

*2.2 psf panel formed of Tensylon 0/90 weave with 1" tape.

As shown in FIG. 6, the resultant average $V_{50}$ values for the Tensylon B1 panels of Table 10 were plotted versus temperature and a regression line fitted each series of data points. The ballistic resistance of the panels generally increased as the molding temperature was decreased.

Although the embodiments of ballistic-resistant panels describe above were prepared at specific parameters, other variations of processing conditions are possible without departing from the scope of the invention. For example, although the Tensylon UHMWPE tape in adjacent layers of the ballistic-resistant panel were oriented at 0° and 90° respectively, other orientations are possible, such as 0° and 45° in adjacent layers, or 0°, 45°, and 90° for each three successive layers. Preferably the direction of orientation of 5' the tape in each of the interleaved layers of non-fibrous ultra high molecular weight polyethylene tape is at an angle of at least 30 degrees with respect to the direction of orientation of the tape in an adjacent layer. Although the specific molding temperatures tested herein were between 180 and 280° F., it is believed that molding temperatures between 150° F. and 300° F. are acceptable for forming a ballistic-resistant panel according to the present invention. Although specific molding pressures of 150, 500, and 3000 psi were tested, it is believed that molding pressures of at least 100 psi and greater are acceptable for forming ballistic-resistant panels according to the present invention.

As shown hereinabove in Tables 5, 6, and 7, ballistic resistant panels including UHMWPE cross-plied Tensylon as the strike face in combination with HB25 cross-plied fibers embedded in resin as the backing portion of the panel significantly improved the ballistic resistance. This synergistic effect of using cross-plied Tensylon as the strike face in combination with ballistic composites comprised of cross-plied fibers was found in 2.0 psf panels tested with 0.30 cal. projectile (Table 5), 3.3 psf panels tested with 0.30 cal. projectile (Table 6), and 3.8 psf panels tested with M80 ball (Table 7). As a result of these favorable results, additional ballistic resistant panels were constructed to determine the optimal ratio of cross-plied Tensylon in the strike face to cross-plied fibers in the backing portion of the panel. The cross-plied Tensylon UHMWPE tape materials tested in the strike face were Tensylon HTBD-09A and Tensylon HTBD-21D, hereinafter referred to respectively as Tensylon 09A and Tensylon 21D, and available from BAE Systems Tensylon High Performance Materials, Inc., Monroe, N.C. The cross-plied fiber backing material was HB26 available from DSM Dyneema B.V., Urmond, the Netherlands. The ballistic resistant panels are identified herein as Tensylon/HB26 hybrids.

For operation of the present invention, cross-plied layers of Tensylon tape were bonded together as shown in FIGS. 3 and 4. The single layer of cross-plied 0/90 included two layers of tape with the first layer of tape oriented with respect to the second layer of tape at a 90 degree angle, hereinafter referred to as cross-plied 0/90. Each Tensylon tape 64 had a nominal cross section of 0.0025×6.7 inches and a denier of 78,390. The cross-plied Tensylon 09A layers included a polyolefin adhesive on two sides of the monolayers for a total nominal adhesive weight of 10.4 wt % as shown in row 1 of Table 2. The cross-plied Tensylon 21D included polyolefin adhesive on one side of each monolayer for a total nominal adhesive weight of 5.7 wt % as shown in row 2 of Table 2. A backing panel portion was then formed by stacking a plurality of plies of HB26 fibers. Various plies of Tensylon were then stacked on the plies of HB26 to form a strike face of the desired weight and to meet a target weight percent in the final ballistic panel. The combined layers including the strike face and backing portions were then bonded together with heat and pressure to form the ballistic panel. Each HB26 layer or ply in turn was a composite of four layers of fiber oriented at 0°/90°/0°/90° that measured 0.014-inch thick and was bonded together with a polyurethane adhesive. Hybrid panels were formed by adhering each Tensylon strike face portion to the corresponding HB26 backing portion to achieve a panel with the desired weight ratio of Tensylon strike face to HB26 backing. Table 11 provides the areal densities and number of plies used to form the test panels.

For each set of tests, a first control panel was formed of 100% Tensylon (monolithic Tensylon) and a second control panel was formed of 100% HB26 (monolithic HB26). The individual tapes in the cross-plied Tensylon 09A product had a cross sectional size of 0.0025×6.7 inches and a denier of 78,390. In order to determine an optimal protection level against threat, additional panels were constructed of Tensylon/HB26 hybrid ratios of 50/50, 40/60, 30/70, 20/80, and 10/90, wherein the first number in the hybrid ratio refers to the weight percentage of the strike face material and the second number refers to the weight percentage of the backing portion material. Four sets of test panels were prepared, including 1) 3.8 psf panels of Tensylon 09A/HB26, 2) 4.28 psf panels of Tensylon 09A/HB26, 3) 3.8 psf panels of Tensylon 21D/HB26, 2) and 4.28 psf panels of Tensylon 21D/HB26. Each of the test panels was molded at 3000 psi.

TABLE 11

Areal densities and individual plies in strike face and backing:

| Hybrid Ratio | Strike Face Material | Backing Material | Areal Density of Panel (psf) | # Plies Tensylon | # Plies HB26 |
| --- | --- | --- | --- | --- | --- |
| 10/90 | Tensylon 09A | HB26 | 3.8 | 16 | 64 |
| 20/80 | Tensylon 09A | HB26 | 3.8 | 32 | 57 |
| 30/70 | Tensylon 09A | HB26 | 3.8 | 48 | 50 |
| 40/60 | Tensylon 09A | HB26 | 3.8 | 64 | 43 |
| 50/50 | Tensylon 09A | HB26 | 3.8 | 80 | 35 |
| 10/90 | Tensylon 09A | HB26 | 4.28 | 18 | 72 |
| 20/80 | Tensylon 09A | HB26 | 4.28 | 36 | 64 |
| 30/70 | Tensylon 09A | HB26 | 4.28 | 54 | 56 |
| 40/60 | Tensylon 09A | HB26 | 4.28 | 72 | 48 |
| 50/50 | Tensylon 09A | HB26 | 4.28 | 90 | 40 |
| 10/90 | Tensylon 21D | HB26 | 3.8 | 17 | 64 |
| 20/80 | Tensylon 21D | HB26 | 3.8 | 34 | 57 |
| 30/70 | Tensylon 21D | HB26 | 3.8 | 51 | 50 |
| 40/60 | Tensylon 21D | HB26 | 3.8 | 68 | 43 |
| 50/50 | Tensylon 21D | HB26 | 3.8 | 85 | 35 |
| 10/90 | Tensylon 21D | HB26 | 4.28 | 19 | 72 |
| 20/80 | Tensylon 21D | HB26 | 4.28 | 38 | 64 |
| 30/70 | Tensylon 21D | HB26 | 4.28 | 57 | 56 |
| 40/60 | Tensylon 21D | HB26 | 4.28 | 77 | 48 |
| 50/50 | Tensylon 21D | HB26 | 4.28 | 96 | 40 |

All of the Tensylon/HB26 hybrids were processed at 3,000 psi, 30 minute soak at temperature. The Tensylon 09A hybrids were processed at 234° F., and the Tensylon 21D hybrids were processed at 248° F. All data collected was done on 16"×16" panels. The hybrids were all co-cured, and the interlayer between the Tensylon strike face and the HB26 backing was 3M 9485 5 mil pressure sensitive acrylic adhesive, which is available from 3M of St. Paul, Minn. Hybrids bonded with other materials, such as those shown in Table 1, are expected to perform equally well.

The two target areal densities of the panels, 3.8 psf and 4.28 psf, were determined by the threat. For all Tensylon 09A/HB26 and Tensylon 21D/HB26 evaluated against M80 ball, the areal density was 3.8 lb/ft$^2$ (panel weight was 6.75 lb). For all Tensylon 09A/HB26 and Tensylon 21D/HB26 evaluated against PS Ball (Type M1943), the areal density was 4.28 lb/ft$^2$ (panel weight was 7.6 lb).

In the following tables, Tables 12a, 13a, 14a, and 15a present the processing conditions for each panel including the ratio by weight of Tensylon in the strike face to HB26 in the backing, the molding pressure and temperature, and the areal density. Tables 12b, 13b, 14b, and 15b present the threats, the average V50 in feet per second, and number of shots used to calculate the V50 (in parentheses). The ballistic resistance test results in Tables 12b, 13b, 14b, and 15b are shown graphically in FIGS. 7-10 respectively. FIGS. 7-10 include the monolithic Tensylon 09A (or Tensylon 21D) V50 and the monolithic HB26 V50.

Tables 12a and 12b present data for ballistic-resistant panels including a strike face constructed of cross-plied Tensylon 09A and a backing of Dyneema HB26. Control panels of monotlithic (100%) Tensylon 09A and monolithic HB26 are also included. The panels included a nominal weight of 3.8 psf and the weight ratio of Tensylon 09A to HB26 was varied as shown in Table 12a. The test panels were then evaluated against the M80 ball and the results of the ballistic resistance test are tabulated in Table 12b.

TABLE 12a

Process conditions for a panel having various ratios of Tensylon 09A in the strike face to HB 26 in the backing:

| ID# | Material 1 (Strike Face) | Material 2 | % Tensylon | Ratio (%) | AD (psf) | Pressure (psi) | Temp (° F.) |
|---|---|---|---|---|---|---|---|
| 3464 | Tensylon 09A | N/A | 100 | 100/0 | 3.8 | 3000 | 210 |
| 3465 | HB26 | N/A | 0 | 0/100 | 3.8 | 3000 | 257 |
| 3409 | Tensylon 09A | HB26 | 50 | 50/50 | 3.8 | 3000 | 234 |
| 3466 | Tensylon 09A | HB26 | 40 | 40/60 | 3.8 | 3000 | 234 |
| 3467 | Tensylon 09A | HB26 | 30 | 30/70 | 3.8 | 3000 | 234 |
| 3468 | Tensylon 09A | HB26 | 20 | 20/80 | 3.8 | 3000 | 234 |
| 3469 | Tensylon 09A | HB26 | 10 | 10/90 | 3.8 | 3000 | 234 |

TABLE 12b

Ballistic Resistance Results of the 3.8 psf ballistic resistant panels of Table 12a evaluated against the M80 ball with the Tensylon 09A oriented toward the threat:

| ID# | Ratio 09A/HB26 | Threat | V50-1 (fps) | V50-2 (fps) | Average V50 (fps) | Average Spread | Calc. V50 (fps) | Delta V50 (fps) |
|---|---|---|---|---|---|---|---|---|
| 3464 | 100/0 | M80 Ball | 2335 (2) | 2561 (4) | 2448 | 67 | — | — |
| 3465 | 0/100 | M80 Ball | 3102 (2) | 3136 (2) | 3119 | 26 | — | — |
| 3409 | 50/50 | M80 Ball | 2931 (2) | 2881 (2) | 2906 | 48 | 2784 | +123 |
| 3466 | 40/60 | M80 Ball | 3025 (2) | 3241 (2) | 3133 | 119 | 2851 | +282 |
| 3467 | 30/70 | M80 Ball | 3132 (2) | 3106 (2) | 3119 | 53 | 2918 | +201 |
| 3468 | 20/80 | M80 Ball | 3185 (2) | n/a | 3185 | 30 | 2985 | +200 |
| 3469 | 10/90 | M80 Ball | 3240 (2) | n/a | 3240 | 12 | 3052 | +188 |

The ballistic resistance results from Table 12b are shown graphically in FIG. 7. As shown in the graph, the V50 value increased with lower percentages of cross-plied Tensylon 09A in the strike face. The M80 ball test results show that the Tensylon/HB26 panels outperformed the monolithic HB26 panel at Tensylon/HB26 ratios of approximately 30/70 and lower. The highest V50 obtained was 3240 fps for the panel with 10% Tensylon 09A and 90% HB26. The number of shots used in calculating the V50 values is shown in the parentheses following the V50-1 and V50-2 results.

Data for another set of ballistic resistant panels with various levels of cross-plied Tensylon 09A and Dyneema HB26 are shown in Tables 13a and 13b. The 4.28 psf panels were evaluated against the PS Ball with the Tensylon 09A oriented toward the threat and the results are shown in FIG. 13*b*.

TABLE 13a

Process conditions for a panel having various ratios of Tensylon 09A in the strike face to HB 26 in the backing:

| ID# | Material 1 (Strike Face) | Material 2 | % Tensylon | Ratio (%) | AD (psf) | Pressure (psi) | Temp. (° F.) |
|---|---|---|---|---|---|---|---|
| 3645 | Tensylon 09A | N/A | 100 | 100/0 | 4.28 | 3000 | 210 |
| 3638 | HB26 | N/A | 0 | 0/100 | 4.28 | 3000 | 257 |
| 3650 | 09A | HB26 | 50 | 50/50 | 4.28 | 3000 | 234 |
| 3469 | Tensylon 09A | HB26 | 40 | 40/60 | 4.28 | 3000 | 234 |
| 3648 | Tensylon 09A | HB26 | 30 | 30/70 | 4.28 | 3000 | 234 |
| 3647 | Tensylon 09A | HB26 | 20 | 20/80 | 4.28 | 3000 | 234 |
| 3646 | Tensylon 09A | HB26 | 10 | 10/90 | 4.28 | 3000 | 234 |

TABLE 13b

Ballistic Resistance Results of the 4.28 psf ballistic resistant panels of Table 13a evaluated against the PS Ball with the Tensylon 09A oriented toward the threat:

| ID# | Ratio 09A/HB26 | Threat | V50-1 (fps) | V50-2 (fps) | Average V50 (fps) | Average Spread | Calc. V50 (fps) | Delta V50 (fps) |
|---|---|---|---|---|---|---|---|---|
| 3645 | 100/0 | PS Ball | 1898 (4) | 1564 (4) | 1731 | 65 | — | — |
| 3638 | 0/100 | PS Ball | 2636 (4) | 2676 (2) | 2656 | 65 | — | — |
| 3650 | 50/50 | PS Ball | 2554 (4) | 2702 (2) | 2628 | 73 | 2194 | +435 |
| 3469 | 40/60 | PS Ball | 2815 (2) | 2920 (2) | 2868 | 34 | 2286 | +582 |
| 3648 | 30/70 | PS Ball | 2674 (2) | 2823 (2) | 2749 | 38 | 2379 | +371 |
| 3647 | 20/80 | PS Ball | 2799 (4) | 2852 (2) | 2826 | 83 | 2471 | +355 |
| 3646 | 10/90 | PS Ball | 2689 (4) | 2808 (2) | 2749 | 114 | 2564 | +186 |

PS Ball test results from Table 13b are shown graphically in FIG. 8. As shown in the FIG. 8, the regression line showed the V50 value generally increased with lower percentages of cross-plied Tensylon 09A in the strike face. Except for the 50/50 Tensylon/HB26 panel, the PS Ball test results indicate that the Tensylon/HB26 panels outperformed the pure HB26 panel at all Tensylon/HB26 ratios of 40/60 and lower. The number of shots used to calculate the V50 values is again shown in the parentheses following the V50-1 and V50-2 results.

Data for another set of ballistic-resistant panels with various levels of Tensylon 21D and Dyneema HB26 in the strike face are shown in Tables 14a and 14b. The 3.8 psf panels were evaluated against the M80 Ball and the results are shown in FIG. 14*b*.

TABLE 14a

Process conditions for a panel having various ratios of Tensylon 21D in the strike face to HB 26 in the backing:

| ID# | Material 1 (Strike Face) | Material 2 | % Tensylon | Ratio (%) | AD (psf) | Pressure (psi) | Temp. (° F.) |
|---|---|---|---|---|---|---|---|
| 3559 | Tensylon 21D | N/A | 100 | 100/0 | 3.8 | 3000 | 240 |
| 3465 | HB26 | N/A | 0 | 0/100 | 3.8 | 3000 | 257 |
| 3560 | Tensylon 21D | HB26 | 50 | 50/50 | 3.8 | 3000 | 248 |
| 3561 | Tensylon 21D | HB26 | 40 | 40/60 | 3.8 | 3000 | 248 |
| 3562 | Tensylon 21D | HB26 | 30 | 30/70 | 3.8 | 3000 | 248 |
| 3563 | Tensylon 21D | HB26 | 20 | 20/80 | 3.8 | 3000 | 248 |
| 3564 | Tensylon 21D | HB26 | 10 | 10/90 | 3.8 | 3000 | 248 |

TABLE 14b

Ballistic Resistance Results of the 3.8 psf ballistic resistant panels of Table 14a evaluated against the M80 Ball with the Tensylon 21D oriented toward the threat:

| ID# | Ratio 09A/HB26 | Threat | V50-1 (fps) | V50-2 (fps) | Average V50 (fps) | Average Spread (fps) | Calc. V50 (fps) | Delta V50 (fps) |
|---|---|---|---|---|---|---|---|---|
| 3559 | 100/0 | M80 Ball | 2688 (4) | 2584 (4) | 2636 | 100 | — | — |
| 3465 | 0/100 | M80 Ball | 3102 (2) | 3136 (2) | 3119 | 26 | — | — |
| 3560 | 50/50 | M80 Ball | 3031 (4) | 3099 (4) | 3065 | 108 | 2878 | +188 |
| 3561 | 40/60 | M80 Ball | 2965 (2) | 3049 (2) | 3007 | 26 | 2926 | +81 |
| 3562 | 30/70 | M80 Ball | 3254 (2) | n/a | 3254 | 81 | 2974 | +280 |
| 3563 | 20/80 | M80 Ball | 3139* | 3292* | 3216 | n/a | 3022 | +194 |
| 3564 | 10/90 | M80 Ball | 3292* | n/a | 3292 | 21 | 3071 | +221 |

3292* - indicates V50 is greater than the Maximum velocity of test barrel reached.

M80 Ball test results from Table 14b are shown graphically in FIG. 9. As shown in the FIG. 9, the regression line depicts an increase in the V50 value with lower percentages of cross-plied Tensylon 21D in the strike face. The regression line indicates that the Tensylon/HB26 panels outperformed the pure HB26 panel at Tensylon/HB26 ratios of approximately 37/63 and lower.

Data for another set of ballistic-resistant panels with various levels of cross-plied Tensylon 21D and Dyneema HB26 in the strike face are shown in Tables 15a and 15b. The 4.28 psf panels were evaluated against the PS Ball and the results are shown in FIG. 15b.

TABLE 15a

Process conditions for a panel having various ratios of Tensylon 21D in the strike face to HB 26 in the backing:

| ID# | Material 1 (Strike Face) | Material 2 | % Tensylon | Ratio (%) | AD (psf) | Pressure (psi) | Temp. (° F.) |
|---|---|---|---|---|---|---|---|
| 3639 | Tensylon 21D | N/A | 100 | 100/0 | 4.28 | 3000 | 240 |
| 3638 | HB26 | N/A | 0 | 0/100 | 4.28 | 3000 | 257 |
| 3644 | Tensylon 21D | HB26 | 50 | 50/50 | 4.28 | 3000 | 248 |
| 3643 | Tensylon 21D | HB26 | 40 | 40/60 | 4.28 | 3000 | 248 |
| 3642 | Tensylon 21D | HB26 | 30 | 30/70 | 4.28 | 3000 | 248 |
| 3641 | Tensylon 21D | HB26 | 20 | 20/80 | 4.28 | 3000 | 248 |
| 3640 | Tensylon 21D | HB26 | 10 | 10/90 | 4.28 | 3000 | 248 |

TABLE 15b

Ballistic Resistance Results of the 4.28 psf ballistic resistant panels of Table 15a evaluated against the PS Ball with the Tensylon 21D oriented toward the threat:

| ID# | Ratio (%) | Threat | V50-1 (fps) | V50-2 (fps) | Average V50 (fps) | Average Spread (fps) | Calc. V50 (fps) | Delta V50 (fps) |
|---|---|---|---|---|---|---|---|---|
| 3639 | 100/0 | PS Ball | 1816 (2) | 2067 (4) | 1942 | 98 | — | — |
| 3638 | 0/100 | PS Ball | 2636 (4) | 2676 (2) | 2656 | 65 | — | — |
| 3644 | 50/50 | PS Ball | 2527 (4) | 2557 (4) | 2542 | 62 | 2299 | +243 |
| 3643 | 40/60 | PS Ball | 2661 (4) | 2384 (4) | 2523 | 117 | 2370 | +153 |
| 3642 | 30/70 | PS Ball | 2696 (4) | 2735 (4) | 2716 | 62 | 2442 | +274 |
| 3641 | 20/80 | PS Ball | 2798 (2) | 2652 (4) | 2725 | 49 | 2513 | +212 |
| 3640 | 10/90 | PS Ball | 2758 (2) | 2782 (4) | 2770 | 102 | 2585 | +185 |

PS Ball test results from Table 15b are plotted and in FIG. 10. The regression line of FIG. 10 shows an increase in the V50 value with lower percentages of cross-plied Tensylon 21D in the strike face. The regression line indicates that the Tensylon/HB26 panels outperformed the monolithic HB26 panel at Tensylon/HB26 ratios of about 30/70 and lower.

As shown hereinabove, for each 10/90 ratio panel, the improvement in V50 as a result of including a strike face of Tensylon was at least 93 fps for the M80 Ball test, which is NIJ Standard 0108.01 Level III, and at least 114 fps for the PS Ball. Thus, a ballistic resistant panel as described herein in Tables 12a through 15b, with a Tensylon strike face comprising 40% or less of the total panel weight, form a preferred embodiment according to the present invention.

The properties of the individual Tensylon tapes or strips forming the cross-plied layers of Tensylon 09A and Tensylon 21D in the strike face portion of the preferred embodiment of the panels would include a thickness of 0.0015 inches to 0.0035 inches and preferably a thickness of 0.002 to 0.003 inches, a width of at least 1 inch, and a minimum tenacity of 14 grams/denier. Each Tensylon tape would include a denier of between 11,700 and 140,400 (dtex of 13,000 to 156,000). Each layer of cross-plied 0/90 Tensylon 09A and cross-plied Tensylon 21D in the strike face portion of the preferred embodiment of the panels would include an areal density of 0.015 to 0.040 pounds per square foot and preferably an areal density of 0.02 to 0.03 pounds per square foot with an adhesive content of 2 wt % to 30 wt % and most preferably an adhesive content of 5 wt % to 15 wt %. The direction of orientation of the tape in each of the interleaved layers of cross-plied Tensylon is preferably at an angle of at least 30 degrees with respect to the direction of orientation of the tape in an adjacent layer.

Although in one embodiment herein the Tensylon tape was woven into a fabric using a basket weave, it is within the scope of the present invention to form the Tensylon tape into fabric using any fabric weave, such as plain weave, twill weave, satin weave, and the like. Although the specific examples of the strike face portion of the ballistic resistant panels herein utilized cross-plied non-fibrous ultra high molecular weight polyethylene tape as the high strength tape component, it is believed that cross-plied non-fibrous ultra high molecular weight polypropylene tape, such as PURE® composite material available from Lankhorst Pure Composites b.v. of Sneek, the Netherlands, could also be used as the high strength tape component. It is believed that the backing portion of a ballistic resistant panel according to the present invention can be formed of several high modulus fibers including ultra high molecular weight polyethylene fibers, aramid fibers, carbon fibers, S2-glass, E-glass, liquid-crystal polymer-based fibers, poly(p-phenylene terephthalamide, poly(m-phenylene isophthalamide), poly(benzobisoxazole, poly(benzobisthiazole), poly(benzobisimidazole), and blends thereof.

Having thus described the invention with reference to a preferred embodiment, it is to be understood that the invention is not so limited by the description herein but is defined as follows by the appended claims.

What is claimed is:

1. A ballistic resistant panel comprising:
   a compressed stack of interleaved layers of high modulus material, said compressed stack of interleaved layers including a strike face portion and a backing portion;
   said strike face portion of said compressed stack including a plurality of interleaved layers of cross-plied non-fibrous ultra high molecular weight polyethylene (UHMWPE) tape;
   each of said layers of cross-plied non-fibrous ultra high molecular weight polyethylene tape including a first layer of unidirectional tape strips bonded together at their edges, a second layer of unidirectional tape strips bonded together at their edges, and said tape strips in said first and second layers are at an angle of 90° with respect to each other; and
   said backing portion of said compressed stack including a plurality of interleaved layers of cross-plied fibers embedded in resin.

2. The ballistic resistant panel of claim 1 wherein
   each of said layers of cross-plied non-fibrous ultra high molecular weight polyethylene tape includes a plurality of tape strips;
   said tape strips include edges; and
   said tape strips are fused together in a butt joint or overlap joint at said edges.

3. The ballistic resistant panel of claim 2 wherein said non-fibrous ultra high molecular weight polyethylene tape strips include
   a viscosity-average molecular weight of at least 2,000,000;
   a thickness of between 0.0015 and 0.004 inch; and
   a modulus of greater than 1400 grams per denier.

4. The ballistic resistant panel of claim 1 wherein said compressed stack of interleaved layers of high modulus material are compressed and bonded together at
   a pressure of between 100 and 4,000 psi; and
   a temperature of between 150 and 300 degrees F.

5. The ballistic resistant panel of claim 1 including an adhesive on at least one side of each of said layers of said cross-plied non-fibrous ultra high molecular weight polyethylene tape.

6. The ballistic resistant panel of claim 5 wherein said adhesive on each of said interleaved layers of said non-fibrous ultra high molecular weight polyethylene tape is selected from the group consisting of polyamide, polyolefin, ethylene vinylacetate copolymer, polyurethane, ethylene acrylic acid copolymer, polystryrene-isoprene copolymer, or ethylene/methacrylic acid copolymer.

7. The ballistic resistant panel of claim 2 wherein said non-fibrous UHMWPE tape strips
   are formed from stretching partially oriented UHMWPE tape to a total draw ratio of 100:1 or greater wherein the draw ratio is defined as the length after stretching divided by the length before stretching;
   said tape strips include a width to thickness ratio of at least 400:1; and
   said tape strips include a denier of between 6,000 and 90,000.

8. The ballistic resistant panel of claim 5 wherein said adhesive includes a scrim of adhesive laminated to one side of each of said interleaved layers of non-fibrous UHMWPE tape.

9. The ballistic resistant panel of claim 5 wherein
   each of said layers of said cross-plied non-fibrous UHMWPE tape includes two sides; and
   said adhesive is in the form of a resinous adhesive dispersed in a solvent and applied to one side of said non-fibrous UHMWPE tape.

10. A ballistic-resistant panel for incorporation in a fixed or mobile armored structure, said ballistic-resistant panel including
    three layers of high modulus material including two outer layers sandwiched around an inner layer;
    said outer layers including a plurality of cross-plied sheets laminated together by heat and pressure with each of said cross-plied sheets including a plurality of ends of adhesive-coated monolithic non-fibrous ultra high molecular weight polyethylene tape fused together at their edges;
    said inner layer including a plurality of cross-plied fibers embedded in resin; and
    said three layers bonded together by heat and pressure.

11. The ballistic-resistant panel of claim 10 wherein said three layers are molded together at a pressure of between 100 and 4,000 psi and a temperature of between 150 and 300° F. to form said ballistic-resistant panel.

12. The ballistic-resistant panel of claim 10 wherein each of said ends of adhesive-coated monolithic non-fibrous ultra high molecular weight polyethylene tape are 19,000 denier tape with adhesive applied to at least one side of said non-fibrous tape.

13. The ballistic-resistant panel of claim 10 wherein each of said ends non-fibrous ultra high molecular weight polyethylene tape includes
    a viscosity-average molecular weight of at least 2,000,000;
    a width of at least 1.0 inch;
    a thickness of between 0.0015 and 0.004 inch;
    a width to thickness ratio of at least 400:1; and
    a modulus of greater than 1,400 grams per denier.

14. The ballistic-resistant panel of claim 10 wherein said adhesive on said adhesive-coated monolithic non-fibrous ultra high molecular weight polyethylene tape is selected from the group consisting of polyamide, polyolefin, ethylene vinylacetate copolymer, polyurethane, ethylene acrylic acid copolymer, polystryrene-isoprene copolymer, or ethylene/methacrylic acid copolymer.

* * * * *